(12) United States Patent
Kuwert

(10) Patent No.: US 7,075,203 B2
(45) Date of Patent: Jul. 11, 2006

(54) ELECTRIC MOTOR AND METHOD FOR PRODUCING A ROTOR FOR SUCH AN ELECTRIC MOTOR

(75) Inventor: Oswald Kuwert, Tutschfelden (DE)

(73) Assignee: Minebea Co., Ltd., Nagano-ken (JP)

( * ) Notice: Subject to any disclaimer, the term of this patent is extended or adjusted under 35 U.S.C. 154(b) by 8 days.

(21) Appl. No.: 10/777,462

(22) Filed: Feb. 12, 2004

(65) Prior Publication Data

US 2004/0195924 A1   Oct. 7, 2004

(30) Foreign Application Priority Data

Feb. 14, 2003   (DE) ................ 103 07 231

(51) Int. Cl.
*H02K 21/12* (2006.01)

(52) U.S. Cl. ............ 310/156.13; 310/43; 310/156.08; 310/156.12

(58) Field of Classification Search ........ 310/216, 310/43, 156.08, 156.12–156.15, 156.43
See application file for complete search history.

(56) References Cited

U.S. PATENT DOCUMENTS

| | | | | |
|---|---|---|---|---|
| 5,221,503 A | * | 6/1993 | Ward et al. ........ | 264/104 |
| 5,500,994 A | * | 3/1996 | Itaya .................. | 29/598 |
| 6,765,319 B1 | * | 7/2004 | Thompson ............ | 310/43 |
| 6,889,419 B1 | * | 5/2005 | Reiter et al. ......... | 29/596 |
| 2003/0062789 A1 | * | 4/2003 | Stuart et al. ......... | 310/156.48 |

FOREIGN PATENT DOCUMENTS

| | | |
|---|---|---|
| DE | 758 112 | 8/1951 |
| DE | 27 56 626 | 6/1979 |
| DE | 30 21 607 | 12/1981 |
| DE | 195 31 861 | 3/1997 |
| EP | 0 556 914 | 8/1993 |
| GB | 2 025 151 | 1/1980 |
| WO | 97/08716 | 3/1997 |
| WO | 99/12248 | 3/1999 |

\* cited by examiner

*Primary Examiner*—Tran Nguyen
(74) *Attorney, Agent, or Firm*—Lipsitz & McAllister, LLC

(57) ABSTRACT

The invention relates to a brushless electric motor comprising a stator, which has pole elements, and a rotor, which is mounted rotatably in relation to the stator and comprises magnet poles of magnetic powder material bonded to form a body and a back yoke body carrying the magnet poles, the magnet poles being formed by at least one molded magnetic body, which is molded with a back yoke side onto the back yoke body.

12 Claims, 16 Drawing Sheets

ELECTRIC MOTOR AND METHOD FOR PRODUCING A ROTOR FOR SUCH AN ELECTRIC MOTOR

The present disclosure relates to the subject matter disclosed in German application No. 103 07 231.4 of Feb. 14, 2003, which is incorporated herein by reference in its entirety and for all purposes.

BACKGROUND OF THE INVENTION

The invention relates to a brushless electric motor comprising a stator, which has pole elements, and a rotor, which is mounted rotatably in relation to the stator and comprises magnet poles of magnetic powder material bonded to form a body and a back yoke body (otherwise called a back circuit body or flux return body) carrying the magnet poles.

The invention is based on the object of conceiving such an electric motor in such a way that it can be produced at the lowest possible cost.

SUMMARY OF THE INVENTION

In the case of an electric motor of the type described at the beginning, this object is achieved according to the invention by the magnet poles being formed by at least one molded magnetic body, which is molded with a back yoke side onto the back yoke body.

The advantage of the solution according to the invention is to be regarded as being that the molding of the molded magnetic body onto the back yoke body considerably simplifies the production of the rotor, since it dispenses with the need for laborious processing on sides of the back yoke body and in particular also of the back yoke side of the molded magnetic body.

In addition, the solution according to the invention offers the advantage that it provides an easy possibility for permanently fixing the molded magnetic body on the back yoke body, to be specific by the molded magnetic body already being molded onto the back yoke body during its production.

In principle, it is adequate to mold the molded magnetic body onto the side of the back yoke body intended for receiving it.

In particular when great centrifugal forces occur, however, it is advantageous if the back yoke body has positively connecting elements, onto which the at least one molded magnetic body is molded adaptively in terms of positive engagement.

Even with such a positive connection between the back yoke body and the molded magnetic body, the molding process according to the invention has advantageous effects, since the molded magnetic body behaves adaptively in terms of positive engagement and consequently no laborious processing steps are required to produce the positive engagement.

The positive connection between the back yoke body and the molded magnetic body could, for example, be effective only in the azimuthal direction or axial direction.

It is particularly advantageous, however, if the positive connection forms a positive engagement that is effective in the radial direction.

In principle, it would be conceivable for the at least one molded magnetic body to comprise individual magnets disposed successively in the azimuthal direction and held on the back yoke body.

It is particularly advantageous, however, if the at least one molded magnetic body forms an annular body which is molded onto the back yoke body.

Furthermore, when forming an annular body, there could also be partial butting of the molded magnetic body against the back yoke body.

It is particularly advantageous, in particular also for the forming of the magnetic return, if the at least one molded magnetic body butts against the back yoke body in an azimuthally closed manner.

With regard to the production of the sintered magnetic body, that is to say with regard to the molding of the molded magnetic body onto the back yoke body, it has proven to be particularly advantageous if the back yoke body with a region carrying the molded magnetic body is a molding part of a mold that is lost during the molding of the at least one molded magnetic body.

In order to achieve secure fixing of the molded magnetic body on the back yoke body, it is preferably provided that the region of the back yoke body carrying the at least one molded magnetic body has thermal expansion properties that are of the same order of magnitude as the thermal expansion properties of the at least one molded magnetic body.

With regard to the forming of the back yoke body, a wide variety of possibilities are conceivable.

For instance, one advantageous exemplary embodiment provides that the back yoke body is produced from steel.

It is in this case preferably provided that the back yoke body is a one-piece steel body.

As an alternative to this, a further advantageous embodiment provides that the back yoke body is formed as a stack comprising individual metal laminations.

With regard to the stacking direction of the laminated stack, it has proven to be particularly advantageous in this respect if the stack of metal laminations is stacked in the direction of an axis of the rotor.

A further advantageous exemplary embodiment of a back yoke body according to the invention provides that the latter is formed as a molded back yoke body.

Such a molded back yoke body has the advantage that the latter can likewise be produced in a simple way and that the solution according to the invention does away with the disadvantages of a molded back yoke body, which are manifested in that its side intended for receiving the molded magnetic body has an imprecise surface form after molding, which according to the prior art first had to be processed in order to mount a magnet, which for its part also had to be processed with great precision. In the case of the solution according to the invention, on the other hand, such an imprecisely defined surface of the molded back yoke body for receiving the molded magnetic body is unproblematical and does not require any further processing, since the molded magnetic body can be molded directly onto the side of the molded back yoke body that is intended for it and unprocessed, and a relatively great surface roughness has advantageous effects for the connection between the molded back yoke body and the molded magnetic body.

With regard to the forming of the carrier body, no details have been given in connection with the exemplary embodiments described so far. In the simplest case, the carrier body may be formed as a shaft, but also as an assembled component. A solution that is particularly advantageous in production engineering terms provides that the carrier body of the rotor is a one-piece steel body.

In addition, the forming of the molded magnetic body has not been specified in any more detail in connection with the explanation so far of the individual exemplary embodiments.

A particularly advantageous solution provides that the molded magnetic body is a sintered magnetic body.

Such a sintered magnetic body has all the known advantages of a sintered magnet, but not its disadvantages in connection with the present invention, since, because the sintered magnetic body is molded directly onto the back yoke body, it is not necessary to process the side of the sintered magnetic body facing the back yoke body, a process which in the known solutions has always involved effort and has consequently been costly.

Rather, the provision of a sintered magnetic body offers the great advantage that, because of the molding onto the back yoke body, it can be produced and molded in a simple way and, furthermore, can be fixed on it in a simple way with adaptation to any desired forms of the back yoke body.

In addition, no details have been given in connection with the exemplary embodiments so far with regard to the production of the back yoke body. For instance, an advantageous exemplary embodiment provides that the back yoke body is produced from soft-magnetic material as a molded back yoke body.

One possibility for the production of such a molded back yoke body provides that the molded back yoke body is a sintered back yoke body.

As an alternative to the provision of a sintered magnetic body, in the case of a further advantageous exemplary embodiment it is provided that the molded magnetic body is produced from plastic-bonded magnetic powder material. Such production of the molded magnetic body has also proven to be particularly advantageous, since it means that low-cost production of the molded magnetic body is likewise possible in a simple way already in connection with the back yoke body.

The use of a plastic-bonded magnetic powder material for producing the molded magnetic body has the advantage that the bonding of the powder material by means of a plastic advantageously allows production techniques from plastics production to be used, and there is consequently also the possibility in particular of producing a solid connection with respect to the back yoke body.

As an alternative to the forming of the molded back yoke body as a sintered back yoke body, it is also advantageous, however, if the molded back yoke body is produced from plastic-bonded magnetic powder material, so that the molding and production methods known from plastics engineering can also be used for the production of the back yoke body, and consequently there is in particular also the possibility of working with known simple and low-cost process technology in production.

In addition, the object according to the invention is achieved by a method for producing rotors for brushless electric motors that comprise magnet poles of sintered material and also a soft-magnetic back yoke body in that, according to the invention, at least one molded magnetic body of magnetic or hard-magnetic powder material is molded onto the back yoke body.

The advantage of the solution according to the invention likewise lies in the extremely simple production of the unit comprising the back yoke body and the molded magnetic body.

It is particularly advantageous in this case if, during the production of the at least one molded magnetic body as a sintered magnetic body, a green magnetic body (green compact) is molded onto the back yoke body and if the sintered magnetic body is formed by sintering from the green magnetic body molded onto the back yoke body.

The green magnetic body could in this case be molded onto the back yoke body by applying suspended sintering material. A particularly advantageous type of production provides that the green magnetic body is molded onto the back yoke body by pressing on sintering powder.

For simplest possible production of the green magnetic body, it has proven to be particularly advantageous for the molding of the green magnetic body onto the back yoke body if the green magnetic body is molded from sintering powder in a mold.

Such molding of the green body by pressing sintering powder can be realized particularly advantageously by the sintering powder being molded onto the back yoke body in a mold receiving the back yoke body and thereby molded to form the green magnetic body.

It is particularly advantageous in this case if the back yoke body forms a lost molding part of the mold during the molding-on of the green magnetic body.

Soft-magnetic sintering material is used as the sintering material for the back yoke body. It is particularly advantageous if ferromagnetic sintering material is used as the sintering material.

To avoid later corrosion damage to the sintered magnetic body, it is preferably provided that corrosion-insensitive sintering material is used as the sintering material.

With regard to the selection of the material for the back yoke body, it is preferably provided that a material that has a thermal expansion of the same order of magnitude as the thermal expansion of the sintering material is used.

With regard to the further forming of the rotor, it is preferably provided that the back yoke body is fixed on a carrier body of the rotor.

In the simplest case, such a carrier body of the rotor is a shaft. However, the carrier body may comprise a shaft and also an additional receiving body for the back yoke body.

In connection with the embodiments of the method according to the invention described so far, only the production of the molded magnetic body as a sintered magnetic body has been discussed.

As an alternative to this, it is provided within the scope of the solution according to the invention that, during the production of the at least one molded magnetic body, a mixture comprising plastic and magnetic powder material is molded onto the back yoke body under the effect of pressure and heat.

Such a mixture is usually a powder that can on the one hand be compacted and on the other and be bonded by heat to form a solid body.

A further alternative of the method according to the invention provides that, during the production of the at least one molded magnetic body, a composition comprising plastic and magnetic powder material is molded onto the back yoke body.

Such a composition may be, for example, an injection-molding composition that is provided with magnetic powder material and is kept liquid under the effect of heat, but it is also conceivable for this composition to be a composition that is prepared from catalytically curing resin and comprises a magnetic powder material.

In all cases in which the molded magnetic body is produced as a plastic-bonded molded body, it is advantageously provided that the molded magnetic body is molded onto the back yoke body in a mold with the back yoke body as a molding part of the mold, in order to allow the molding of the molded magnetic body onto the back yoke body to be carried out in a simpler and consequently lower-cost way.

With regard to the fixing of the back yoke body on the carrier body, the widest variety of different possibilities are conceivable. For example, it is conceivable to place the back yoke body onto the carrier body after the molding-on of the sintered magnetic body. However, a particularly advantageous solution provides that the back yoke body is fixed on the carrier body before the molding-on of the green magnetic body.

This solution has the great advantage that in this case the carrier body, in particular in the form of a shaft, can be used for exactly positioning, in particular centering, the back yoke body in the mold.

With regard to the forming of the back yoke body itself, no details have been given so far.

For instance, an advantageous exemplary embodiment provides that a solid steel body is used as the back yoke body, such a solid steel body in the simplest case being a one-piece steel body.

Another solution provides that a stack of individual metal laminations is used as the back yoke body.

In the case of a stack of metal laminations, it may be held together by additional means or measures, such as for example pack-stacked stamping. It is particularly advantageous if the stack of metal laminations is held together by the carrier body.

A further alternative of the solution according to the invention provides that the back yoke body is produced from a soft-magnetic powder material as a molded back yoke body. One way of realizing a production method using powder material provides that the back yoke body is produced as a sintered back yoke body. In this case, the advantages of the sintering technique can also be utilized for the production of the sintered back yoke body, without the disadvantages of the sintering technique taking effect, since the sintered magnetic body is for its part once again molded onto the sintered back yoke body.

The sintered back yoke body is in this case preferably produced by forming a green back yoke body from sintering material and subsequently sintering the green back yoke body.

Producing a green back yoke body in such a way preferably takes place by pressing sintering powder.

With regard to the type of production of the green back yoke body, various possibilities are likewise conceivable. For example, sintering material could be applied to a base body to produce the green back yoke body.

It is particularly advantageous, however, if the green back yoke body is produced from the sintering powder in a mold.

The green back yoke body may be produced as a body of its own and subsequently connected to the carrier body. It is particularly advantageous, however, if the back yoke body is molded onto the carrier body, it being possible in particular for such molding of the back yoke body onto the carrier body to be realized by pressing sintering powder onto the carrier body.

A particularly simple type of production of the green back yoke body provides that the sintering powder is pressed onto the carrier body in a mold receiving the carrier body and is thereby molded to form the green back yoke body.

In the case of the methods presented, the connection between the back yoke body and the sintered magnetic body can be established in a wide variety of ways.

One solution provides that the green back yoke body is sintered and then the green magnetic body is molded onto the latter.

An alternative solution provides that the green magnetic body is molded onto the green back yoke body and then both green bodies are subsequently sintered in a joint sintering process.

As an alternative to producing the molded back yoke body as a sintered back yoke body, a further advantageous exemplary embodiment provides that, during the production of the back yoke body, a mixture comprising plastic and soft-magnetic powder material is molded under the effect of pressure and heat.

Such a mixture is, for example, a powder which comprises the plastic in powder form and the soft-magnetic powder, both then being compacted by pressure and bonded by heat, with softening of the plastic.

A further alternative provides that, during the production of the back yoke body, a composition comprising plastic and soft-magnetic powder material is molded.

Such a composition is, for example, either a plastic plasticized by heat with soft-magnetic powder material or a catalytically curing plastic, such as for example a resin with soft-magnetic powder material.

It is particularly advantageous in this case if, during molding, the back yoke body is molded onto the carrier body, in order to achieve a connection with the carrier body already by the production step of molding.

In addition, this procedure has the great advantage that it makes it possible to dispense with precision working-up of the carrier body for receiving the back yoke body, since, as it is molded onto the carrier body, the back yoke body adapts itself exactly and with positive engagement even to inaccuracies and surface roughnesses.

A particularly advantageous production method provides that the back yoke body is molded onto the carrier body in a mold with the carrier body as a molding part of the mold, so that the molding of the back yoke body onto the carrier body can take place in a particularly efficient and simple way.

Further features and advantages of the solution according to the invention are the subject of the description which follows and the representation of several exemplary embodiments.

DETAILED DESCRIPTION OF THE INVENTION

Figure 1:
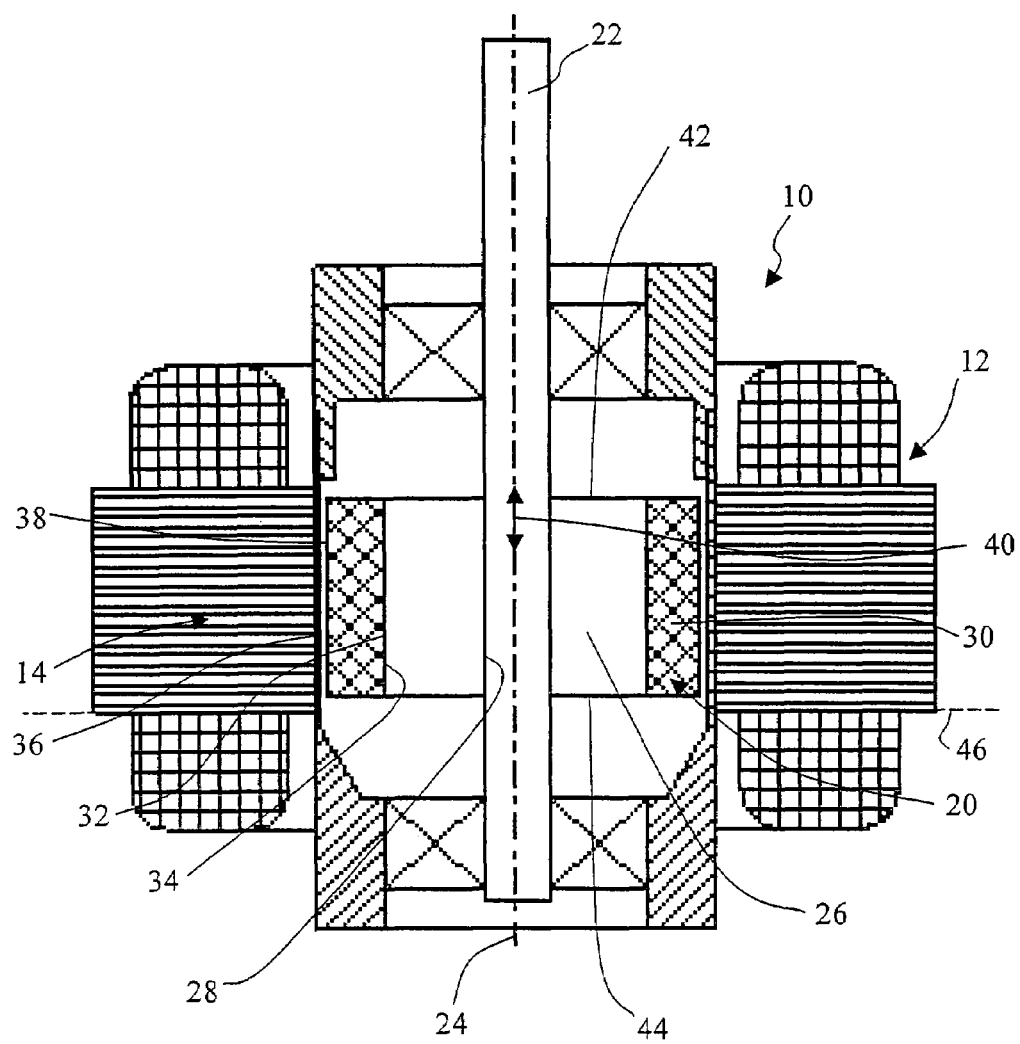
FIG. 1 shows a section through a first exemplary embodiment of an electric motor according to the invention, designed as an internal rotor.

A first exemplary embodiment of a brushless electric motor 10 according to the invention comprises a stator, which is designated as a whole by 12 and is provided with pole elements 14, and a rotor, which is designated as a whole by 20 and comprises a carrier body 22, which in the simplest case is formed as a shaft which is mounted rotatably about an axis 24 in the stator 12, and also a back yoke body 26, which is seated in a rotationally fixed manner on the carrier body 22. The back yoke body 26 preferably has a central aperture 28, through which the shaft serving as the carrier body 22 is fitted, the back yoke body 26 being held in a rotatationally fixed manner on the shaft 22 in the region of the aperture 28, for example by a non-positive connection, for example by a press fit.

The back yoke body 26 for its part carries a molded magnetic body 30, which is molded for example onto an outer peripheral side 32 of the back yoke body 26, as described below. At least one pair of magnet poles, still better several pairs of magnet poles, are formed in the molded magnetic body 30.

On account of the fact that it is molded onto the peripheral side 32 of the back yoke body 26, the molded magnetic body 30 engages against the peripheral side 32 substantially without any gaps and is connected in a rotationally fixed manner to the back yoke body 26, at least by non-positive engagement.

An air-gap side 38 of the molded magnetic body 30, facing an air gap 36 of the electric motor, is in this case preferably disposed in such a way that it lies opposite the back yoke side 34. However, configurations in which the air-gap side 38 and the back yoke side 34 deviate from being disposed strictly opposite each other are also conceivable.

The back yoke body 26 and the molded magnetic body 30 preferably extend in a direction 40 parallel to the axis 24 with the same extent, and respectively form end faces 42, 44 of the rotor 20, which are preferably both aligned parallel to a plane 46 running perpendicularly in relation to the axis 24.

Figure 2:
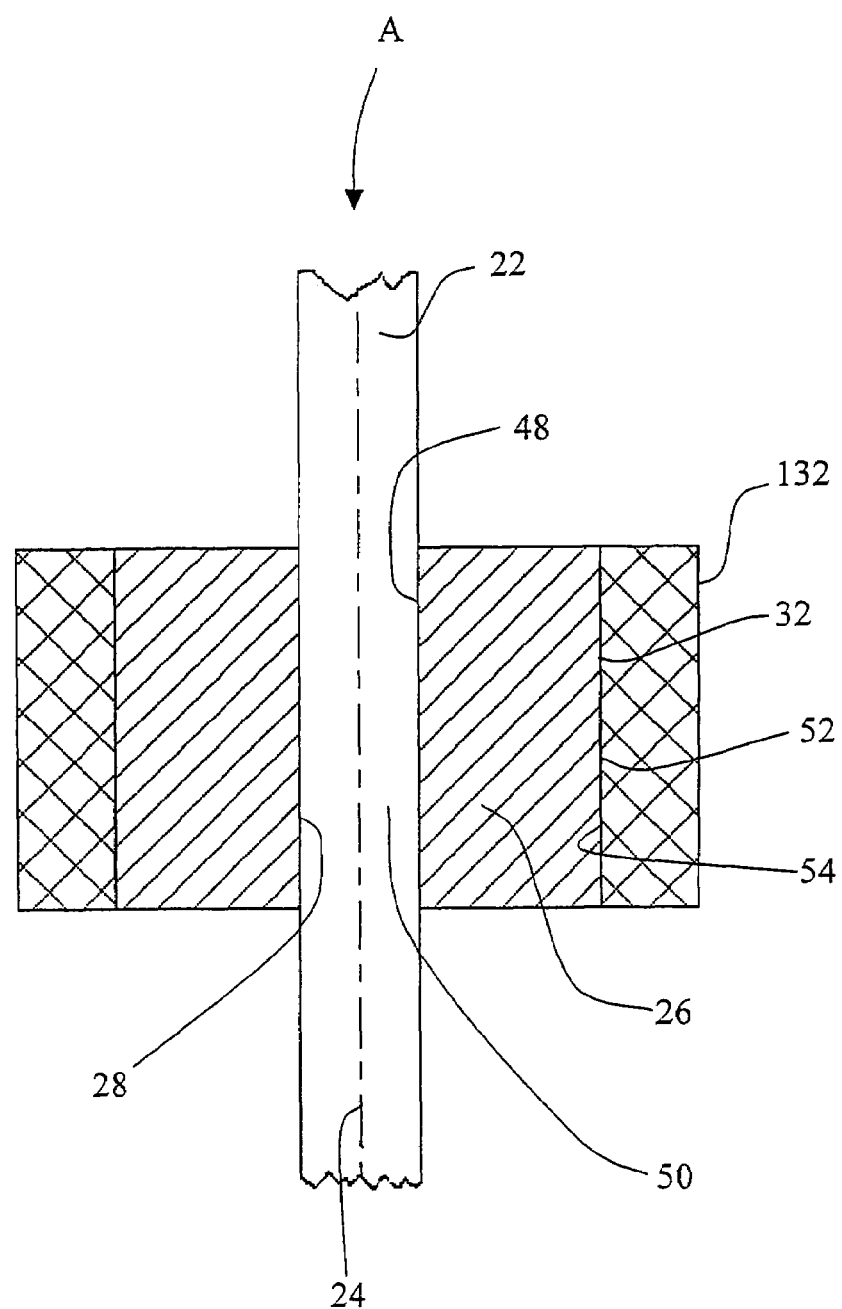
FIG. 2 shows an individual representation of a rotor of the first exemplary embodiment of an electric motor according to the invention in a section similar to FIG. 1.
Figure 3:
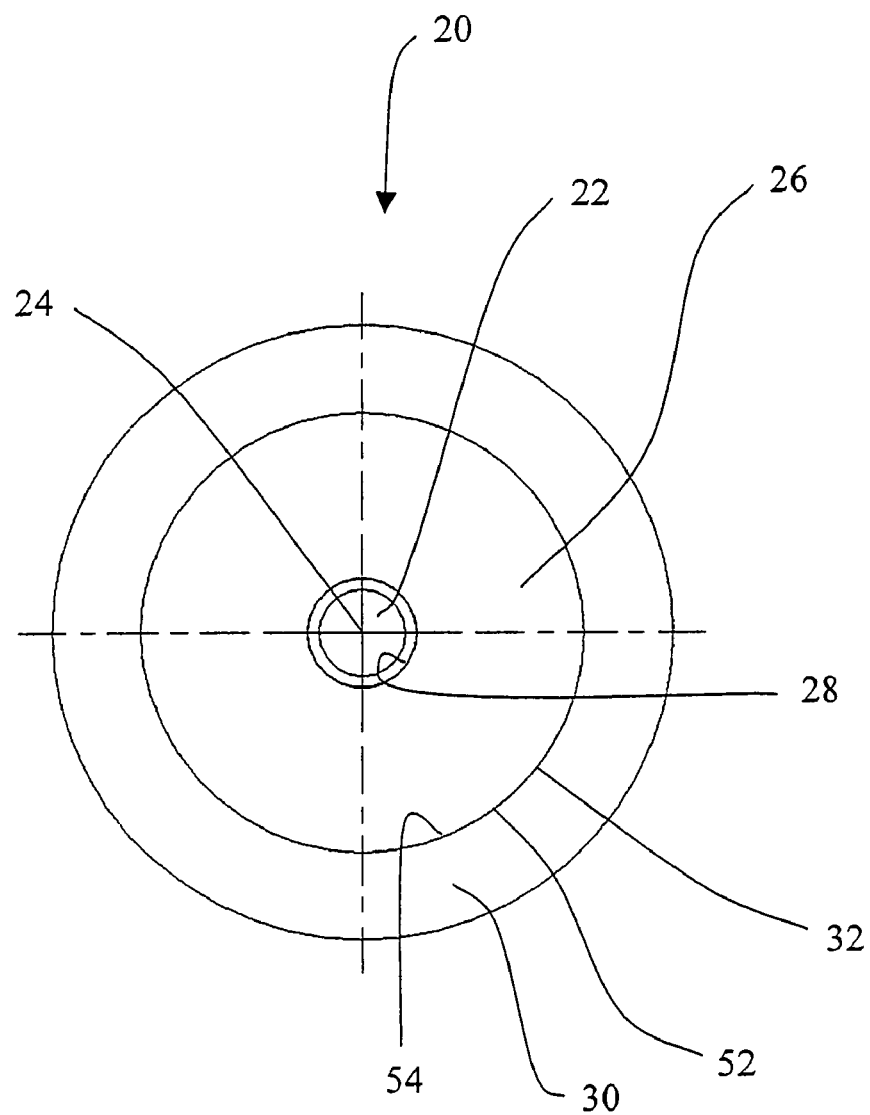
FIG. 3 shows a plan view of the rotor in the direction of the arrow A in FIG. 2.

As further illustrated in FIGS. 2 and 3, in the case of the first exemplary embodiment the back yoke body 26 is a solid steel body, the central aperture 28 of which has a cylindrical inner surface 48, which is seated with a press fit on a sub-region of a circumferential surface 50 of the shaft 22 that is covered by said inner surface. Furthermore, the back yoke body 26, preferably formed in one piece from soft-magnetic steel, has in the region of its peripheral side 32 an outer surface 52, which is cylindrical in relation to the axis 24 and against which the molded magnetic body 30 engages by molding-on with an inner surface 54 that is cylindrical in relation to the axis 24, because of the molding-on substantially in intimate material contact and in a substantially conformal manner.

In the case of the solution according to the invention, on account of the fact that the molded magnetic body 30 is molded onto the outer surface 52 of the back yoke body 26—as described in detail below—it is not required for the outer surface 52 of the back yoke body 26 to be processed and even less required for the inner surface 54 of the molded magnetic body 30 to be processed with precision, since the two surfaces do not have to be brought into engagement subsequently, that is after processing. Rather, it is conceivable in the case of the solution according to the invention to give the outer surface 52 a certain surface roughness or waviness or to leave the outer surface 52 unprocessed, the surface against which the inner surface 54 of the molded magnetic body 30 is made to come into complete contact and substantially without any gaps by the molding-on, so that as a result the molded magnetic body 30 is already forcibly fixed on the back yoke body 26 because of the molding-on.

Figure 4:
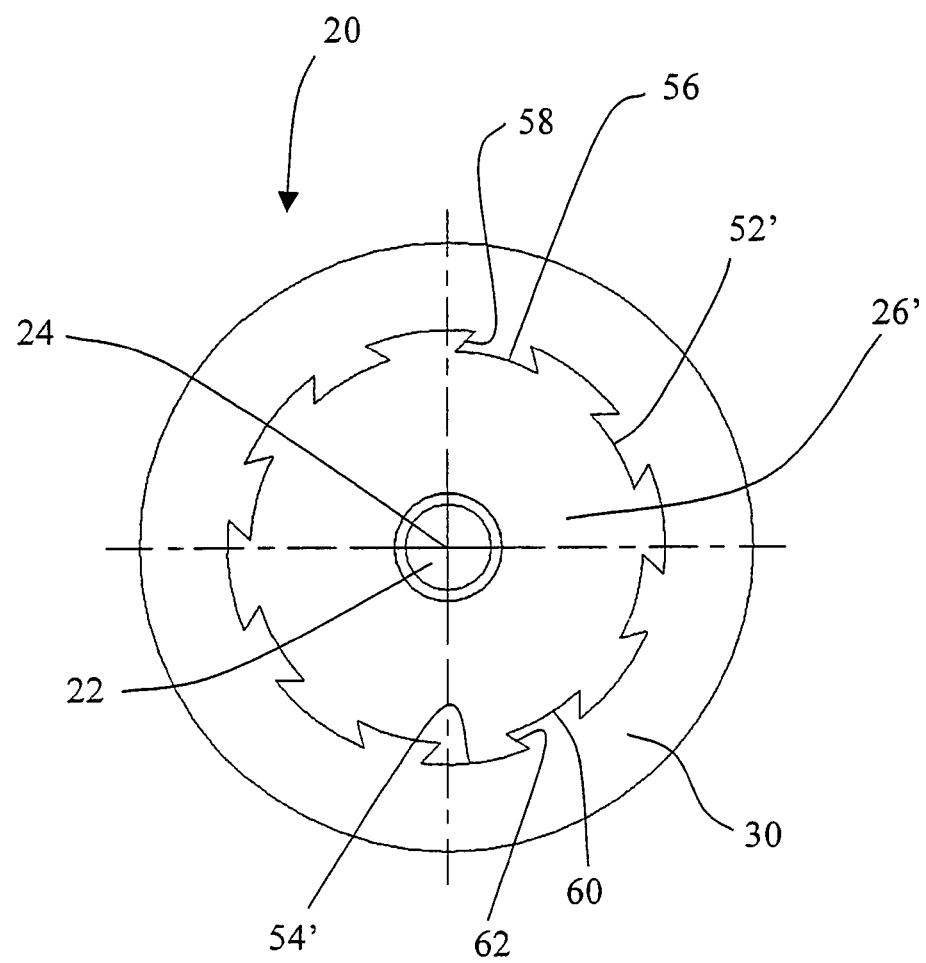
FIG. 4 shows a plan view similar to FIG. 3 in the case of a second exemplary embodiment of a rotor according to the invention.

It is also conceivable, as shown by a second exemplary embodiment represented in FIG. 4, to provide on the outer surface 52' of the back yoke body 26' additional positively connecting elements 56, for example in the form of dovetail-like grooves, with undercuts 58, against which the inner surface 54' of the molded magnetic body 30 is likewise made to come into contact by being molded on, to be precise with the formation of projections 60 that engage in these grooves 56 and have lateral protruding edge regions 62, which engage behind the undercuts 58.

Such an outer surface 52' and a corresponding inner surface 54' molded onto the latter adaptively in terms of form allow the permanent fixing of the molded magnetic body 30 on the back yoke body 26' to be even further improved, in particular in the case of rotors 20 for high rotational speeds, since the positively connecting elements 56 are effective with the undercuts not only in the azimuthal direction but also in the radial direction in relation to the axis 24.

Figure 5:
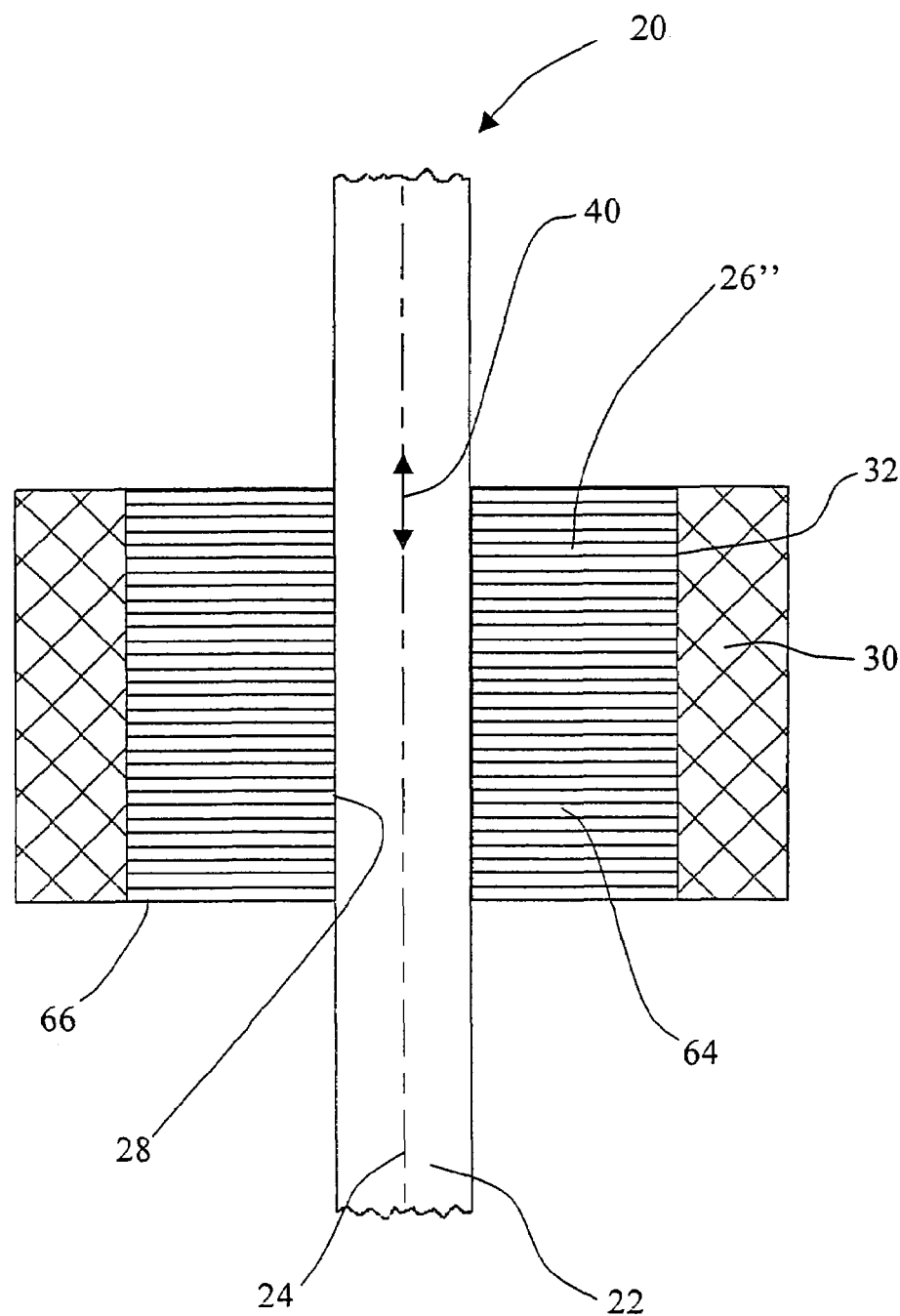
FIG. 5 shows a representation similar to FIG. 2 of a third exemplary embodiment of the rotor according to the invention.
Figure 6:
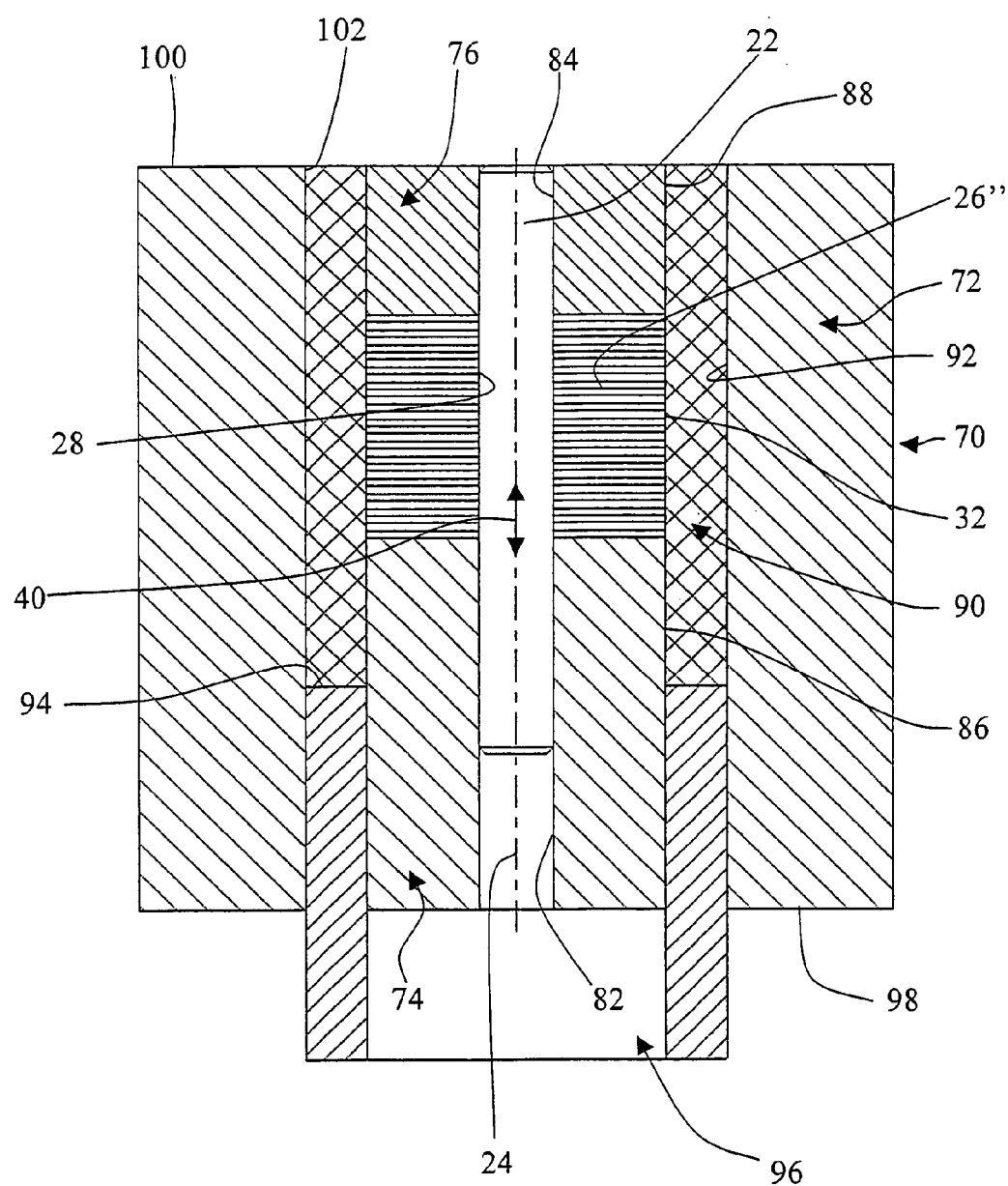
FIG. 6 shows a sectional representation of a lower part of a mold for molding sintering material onto a back yoke body inserted into the latter, according to the third exemplary embodiment.

In the case of a third exemplary embodiment, represented in FIG. 5, the back yoke body 26" is not formed—as in the case of the first exemplary embodiment—in one piece from solid material, for example soft-magnetic steel, but in the form of a stack 64 comprising individual metal laminations 66 which are stacked one on top of the other in a direction 40 parallel to the axis 24 and then altogether form the back yoke body 26" with the aperture 28 and the peripheral side 32.

The metal laminations 66 are preferably interconnected to one another by adhesive bonding, pack-stacked stamping and/or welding or are fixed on the carrier body 22 formed as a shaft in such a way that the carrier body 22 holds the metal laminations 66 together as a stack 64.

The molded magnetic body 30 may be produced and molded onto the back yoke body 26 in a wide variety of ways.

One advantageous type of production of such a molded magnetic body envisages using magnetic powder material and bonding it with plastic, in order in this way to allow the molded magnetic body to be produced and to be molded onto the back yoke body at the same time as said molded magnetic body is being produced.

Examples of the production of such a molded magnetic body bonded with plastic are provided for example by U.S. Pat No. 5,680,692 A or FR 999 112 A or WO 01/69761 A1.

An alternative and likewise very advantageous type of production of a molded magnetic body 30 is that of producing the molded magnetic body 30 as a sintered magnetic body 30, the molding of the molded magnetic body onto the back yoke body and the subsequent sintering likewise exhibiting the advantages described above, and the sintering likewise allowing a very good and gap-free connection to be established between the back yoke body 26 and the sintered magnetic body 30.

The molded parts according to the invention come into their own in particular when a sintered magnetic body is used, by dispensing with the need for the problematical processing of the back yoke side 34 in the case of sintered magnetic bodies 30, since said back yoke side is optimally adapted to the back yoke body 36 on account of the molding-on.

The production of a sintered magnetic body 30 is now described in detail below, it being possible for a similar production method also to be used for producing the molded magnetic body 30 from a plastic-bonded magnetic powder material—as mentioned above.

For the production of the magnetic sintered body 30 in a way corresponding to customary sintering methods with customary hard-magnetic powder material, or for example also with materials and methods according to U.S. Pat. No. 4,496,395 A or U.S. Pat. No. 4,578,242 A, in a way represented in FIGS. 6 to 9 on the basis of the rotor 20 according to the third exemplary embodiment, the back yoke body 26" is in the first instance inserted into the lower part 70 of a mold 120, which comprises an outer part 72 and two inner parts 74 and 76, between which the back yoke body 26" is disposed. The inner parts 74 and 76 preferably have for their part central apertures 82 and 84, which are in line with the central aperture 28 of the back yoke body 26", so that the back yoke body 26" can be inserted with the inserted shaft 22 as a carrier body in a centered manner in relation to the inner parts 74 and 76, the centering taking place for example by means of the shaft 22.

The inner parts 74 and 76 are provided with outer sides 86 and 88, which are formed in line with and preferably adapted in terms of shape to the peripheral side 32 of the back yoke body 26" lying between them.

The outer sides 86 and 88 of the inner parts 74 and 76 then form with the peripheral side 32 of the back yoke body 26" lying between them a side wall of a receiving space 90, while an opposite side wall of the receiving space 90 is formed by an inner wall 92 of the outer part 72, the inner wall 92 preferably representing a cylindrical surface in relation to the axis 24, and the receiving space 90 extending in the direction 40 parallel to the axis 24 respectively beyond the back yoke body 26".

The receiving space 90 between the inner part 74 and the outer part 72 preferably extends beyond the back yoke body 26" in the direction 40 until it is delimited by an annular end face 94 of an annular ram 96, which engages from an end side 98 of the lower part 70 in between the inner part 74 and the outer part 72.

Furthermore, the receiving space 90 between the inner part 76 and the outer part 72 extends beyond the back yoke body 26" until it reaches an end side 100 opposite from the end side 98 and forms an annular opening 102 lying in said end side 100.

The end side 100 and the upper end side of the lower part 70 of the mold preferably lie in one plane, so that filling of the receiving space 90 with sintering powder is possible via this opening 102.

Figure 7:
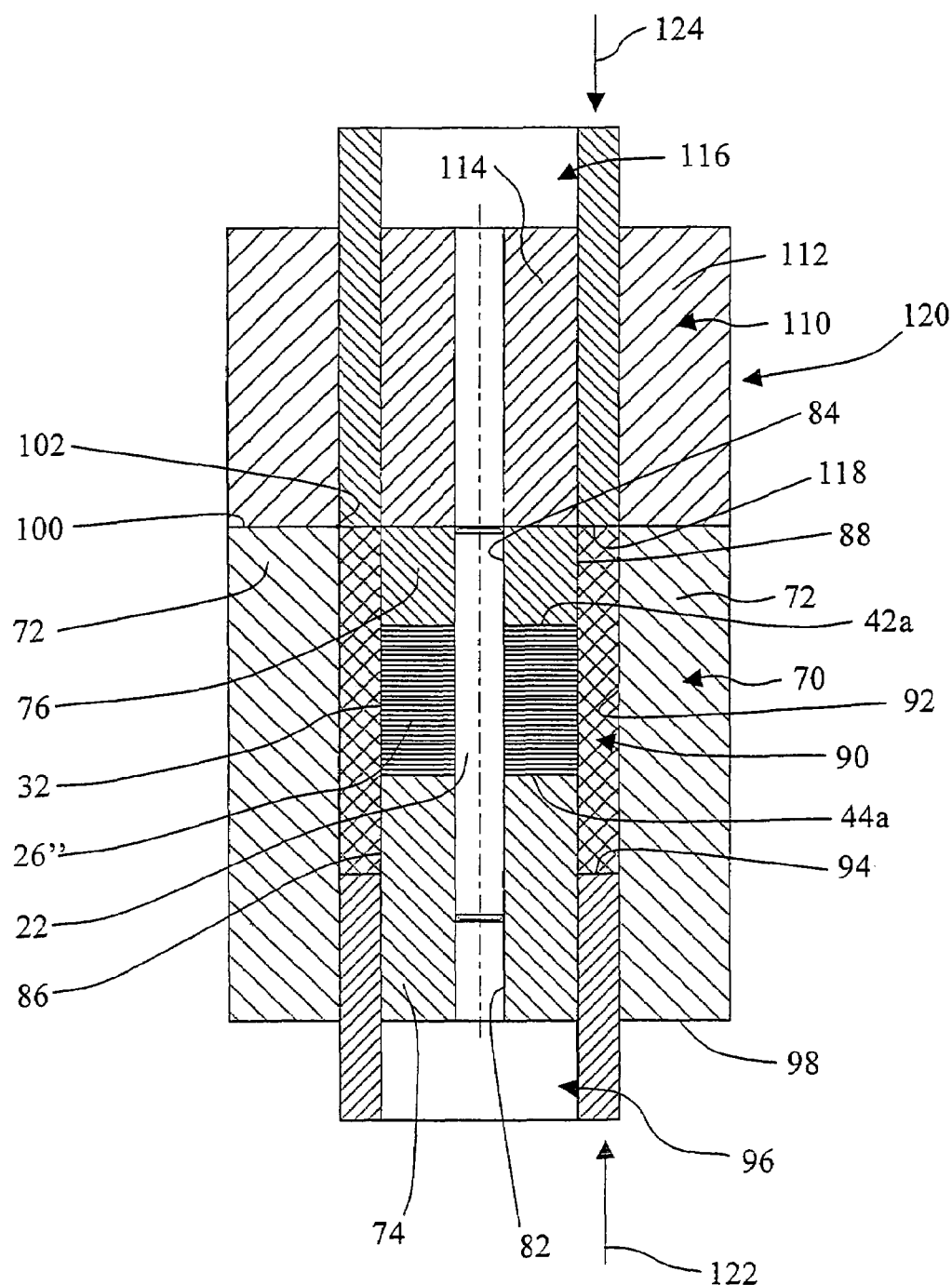
FIG. 7 shows a sectional representation similar to FIG. 6 of the complete mold with the lower part and upper part for producing a green magnetic body of sintering material molded onto the back yoke body.

After complete filling of the receiving space 90 with hard-magnetic sintering powder, an upper part 110 of the mold 120 can be placed onto the lower part 70, as represented in FIG. 7, said upper part forming together with the lower part 70 the mold designated as a whole by 120.

The upper part 110 likewise comprises for example an outer part 112 and an inner part 114, between which there is guided an annular ram designated by 116, which has an annular end face 118 which can be introduced into the receiving space 90 via the opening 102 of the latter, in order to press the sintering powder in the receiving space 90.

The annular ram 116 is preferably formed in this case in such a way that it can be pushed into the annular space 90 flush with the outer side 88 of the inner part 76 and the inner wall 92 of the outer part 72.

Figure 8:
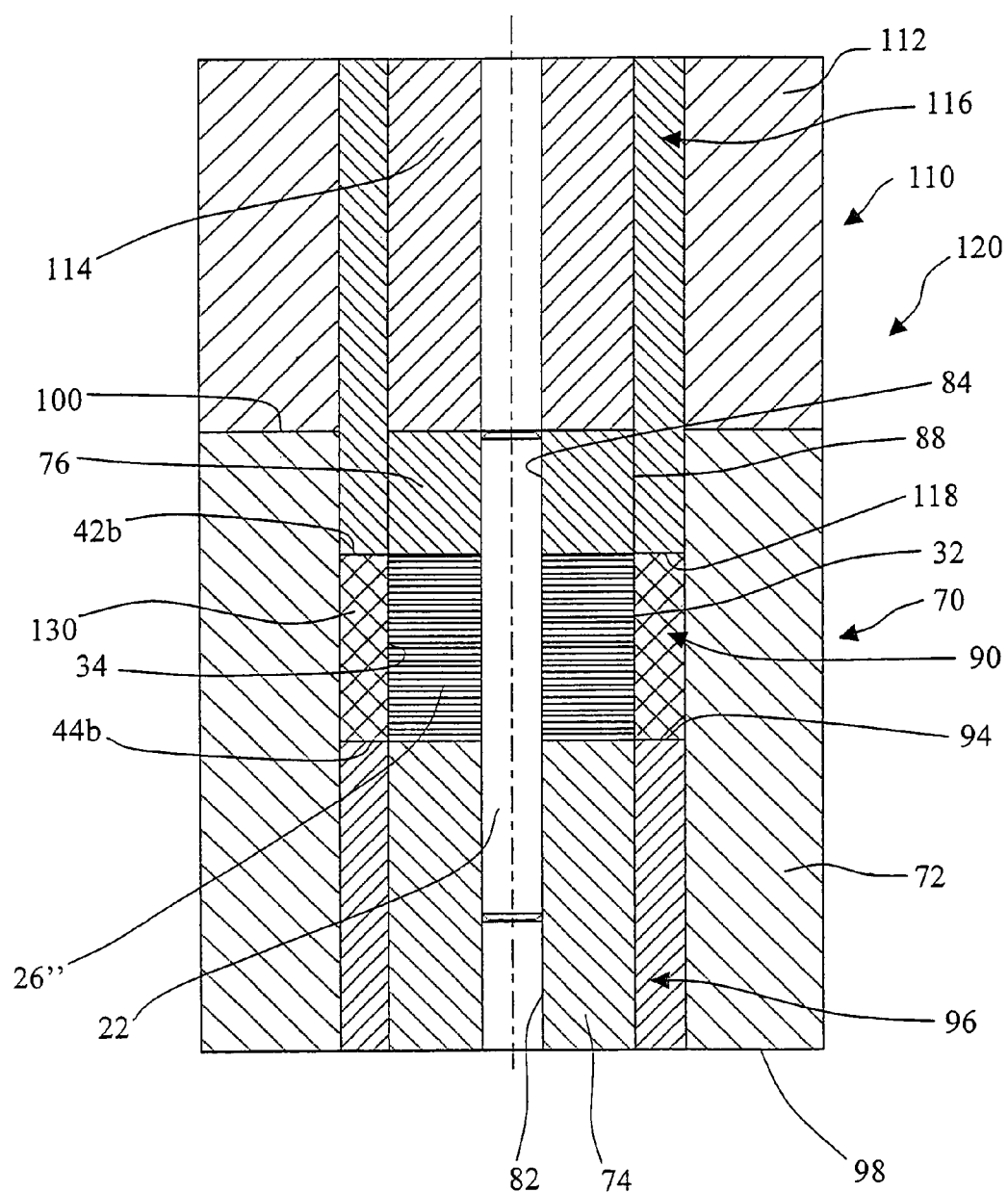
FIG. 8 shows a sectional representation similar to FIG. 7 with the green body produced and molded onto the back yoke body in the mold.
Figure 9:
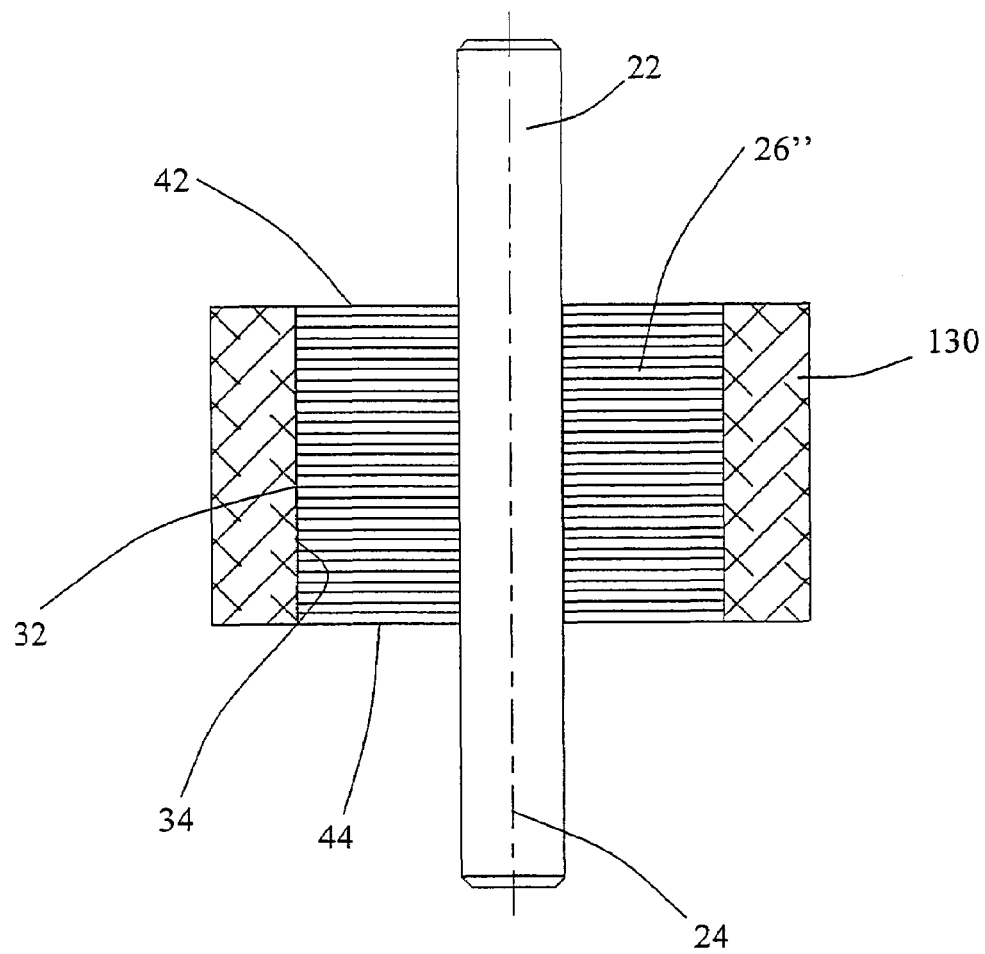
FIG. 9 shows a representation of the rotor with the back yoke body and the molded-on green magnetic body.

The sintering powder introduced into the receiving space 90 until it reaches the opening 102 is pressed by pressing-in of the annular rams 96 and 116 in the direction of the press-movement directions 122 and 124, to be precise to the extent that the ram 96 with its annular end face 94 is displaced in the press-movement direction 122 until the end face 94 is in line with an end side 44a of the back yoke body 26", while the annular ram 116 is pushed in to such an extent in the press-movement direction 126 that its annular end face 118 is in line with the end side 42a of the back yoke body 26", so that, as represented in FIG. 8, the end sides 44b and 42b of the later sintered magnetic body 30 can be defined by the end position of the annular faces 94 and 118, but after the pressing of the sintering powder in the receiving space 90 and the associated pressing of the sintering powder against the peripheral side 32 of the back yoke body 26" serving as the lost part of the mold 120, in the first instance a green magnetic body 130 is obtained, formed by the pressed, but not yet sintered, sintering powder.

However, on account of the pressing of the sintering powder, the green magnetic body 130 already fits snugly and permanently with its back yoke side 34 conforming against the peripheral side 32 of the back yoke body 26", and as a result is already fixed on the latter.

By sintering the green magnetic body 130, the sintering powder bonds to form the sintered magnetic body 130, which then, to achieve a precise geometry on the air-gap side 38, is preferably finished by grinding or some other form-working-up process to produce a precision-processed surface on the air-gap side and a circular-cylindrical surface in relation to the axis 24.

Figure 10:
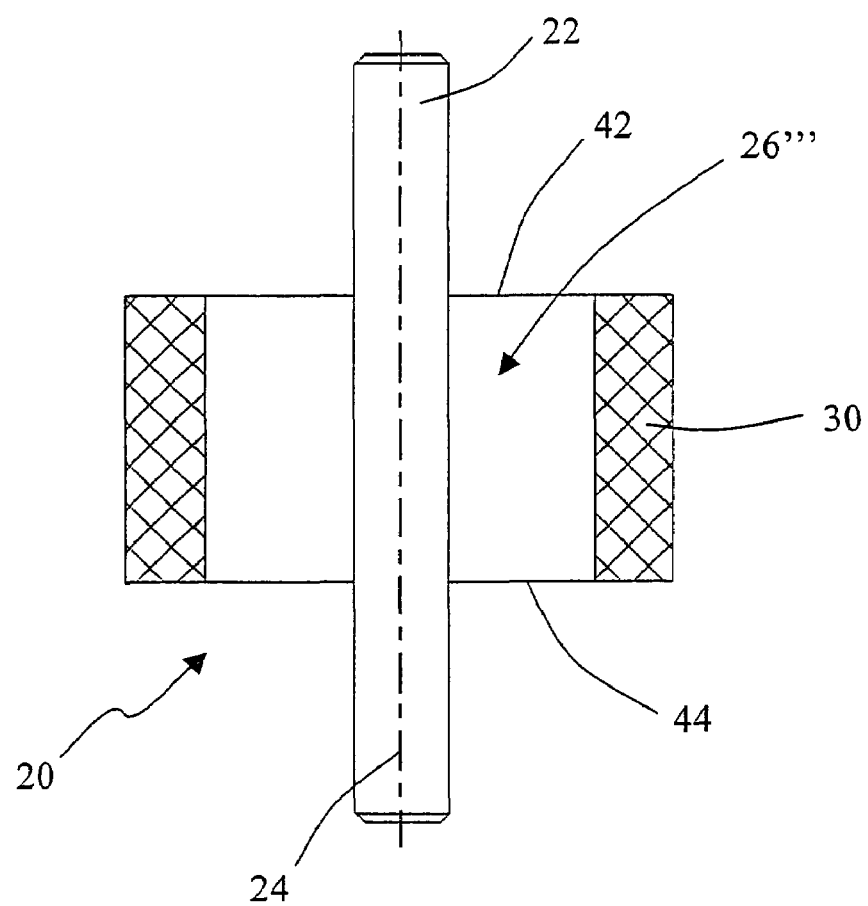
FIG. 10 shows a representation similar to FIG. 2 of a fourth exemplary embodiment of a rotor according to the invention.

In the case of a fourth exemplary embodiment of a rotor 20 according to the invention, represented in FIG. 10, the back yoke body 26''' has the same form as in the case of the previous exemplary embodiments, but the back yoke body 26''' is for its part formed from soft-magnetic powder material as a molded back yoke body.

The molded back yoke body may in this case likewise be produced from a plastic-bonded soft-magnetic powder material, as already mentioned in connection with the production of the molded magnetic body 30. However, it is likewise advantageous to produce the molded back yoke body from a sintered soft-magnetic powder material. The production of such a molded back yoke body as a sintered back yoke body 26''' is now described in detail below, it being possible for such a method also to be used in a similar way for producing a molded back yoke body from plastic-bonded soft-magnetic powder material.

Figure 11:
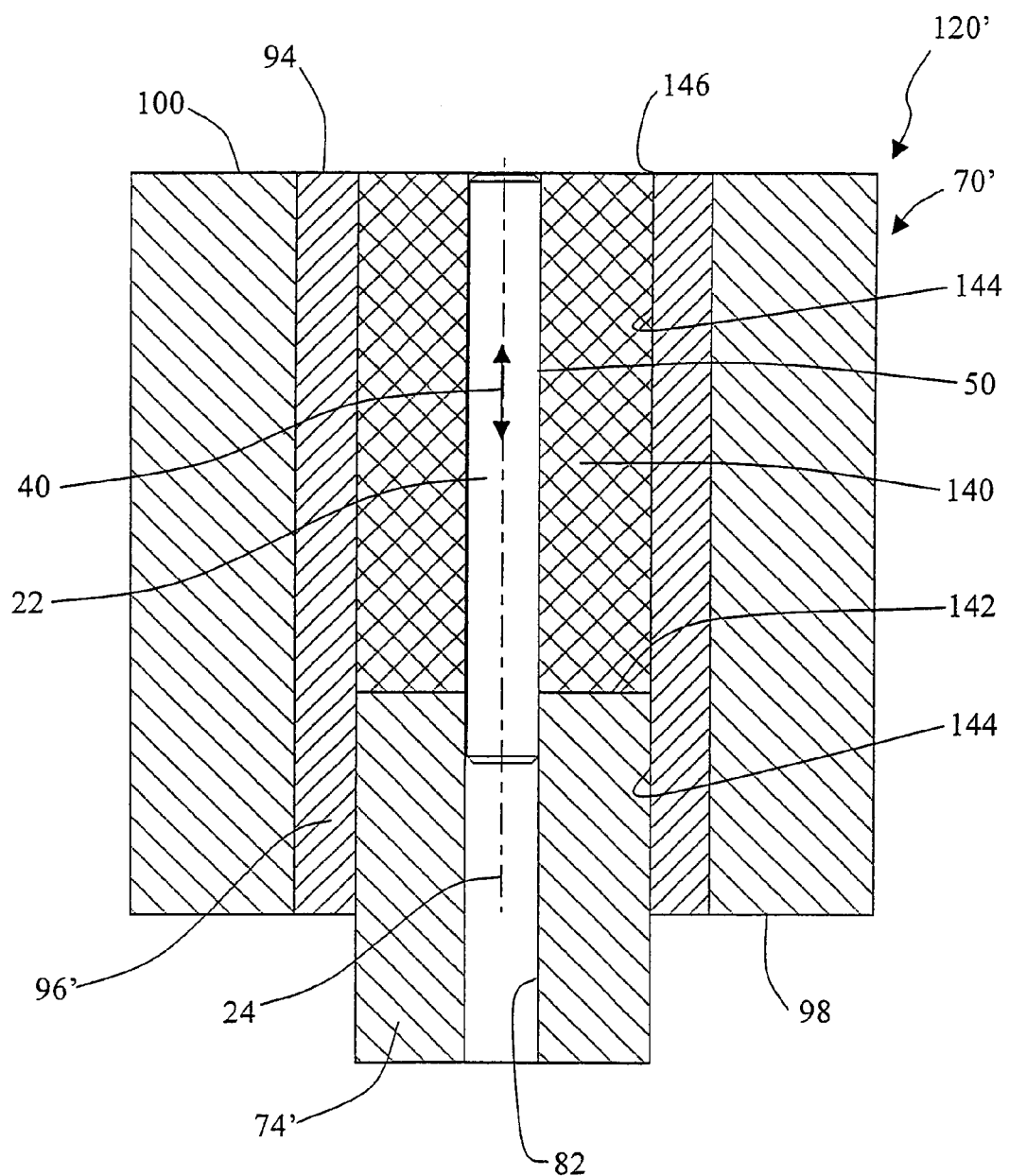
FIG. 11 shows a sectional representation of a lower part of a mold for producing a sintered back yoke body according to the fourth exemplary embodiment.

For the production of such a sintered back yoke body 26''', the mold 120' with its lower part 70' is likewise used, as represented in FIG. 11, it being possible in this case for the inner part 74' to be pulled out from the lower part 70' and the annular ram 96' to be pushed in until its annular end face 94 is in line with the end side 100. The inner part 74' is in this case pulled out to such an extent beyond the end side 98 that an end side 142 of the same is at a spacing from the end side 100 that is greater than the later dimension of the sintered back yoke body 26''' in the direction 40 parallel to the axis 24. Furthermore, the shaft 22 is inserted in the central aperture 82 of the inner part 74'.

The circumferential surface 50 of the shaft 22, the end side 142 and an inner wall 144 of the annular ram 96' consequently delimit a receiving space 140 for sintering powder, which reaches up to the end side 100 and is accessible from the latter via an opening 146 for filling with sintering powder.

Figure 12:
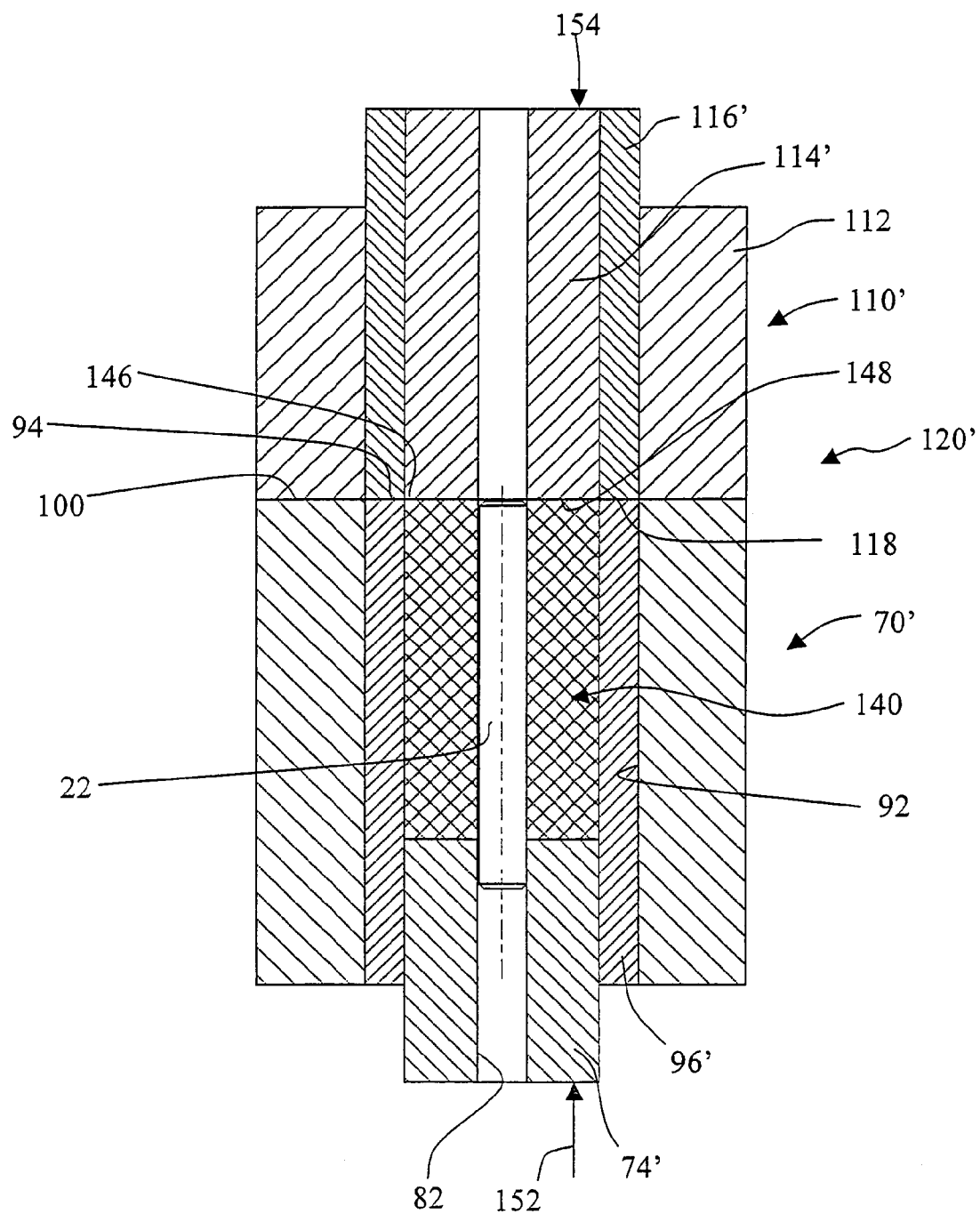
FIG. 12 shows a sectional representation similar to FIG. 11 of the complete mold with the lower part and upper part for producing the sintered back yoke body.

After filling the receiving space 140 with soft-magnetic sintering powder for producing the sintered back yoke body 26''', the placing of the upper part 110' onto the lower part 70' takes place, as represented in FIG. 12, for forming the mold 120', it being possible in the case of the latter for the inner part 114' and the annular ram 116' to be pulled out from the outer part 112, so that, with the upper part 110' placed in position, the annular end face 118 and an end side 148 of the inner part 114' are in line with each other and are likewise aligned such that they are in line with the end side 100 of the lower part 70', so that the annular end face 94 of the annular ram 96' and the annular end face 118 of the annular ram 116' butt against each other and the end side 148 closes the opening 146 of the receiving space 140.

Figure 13:
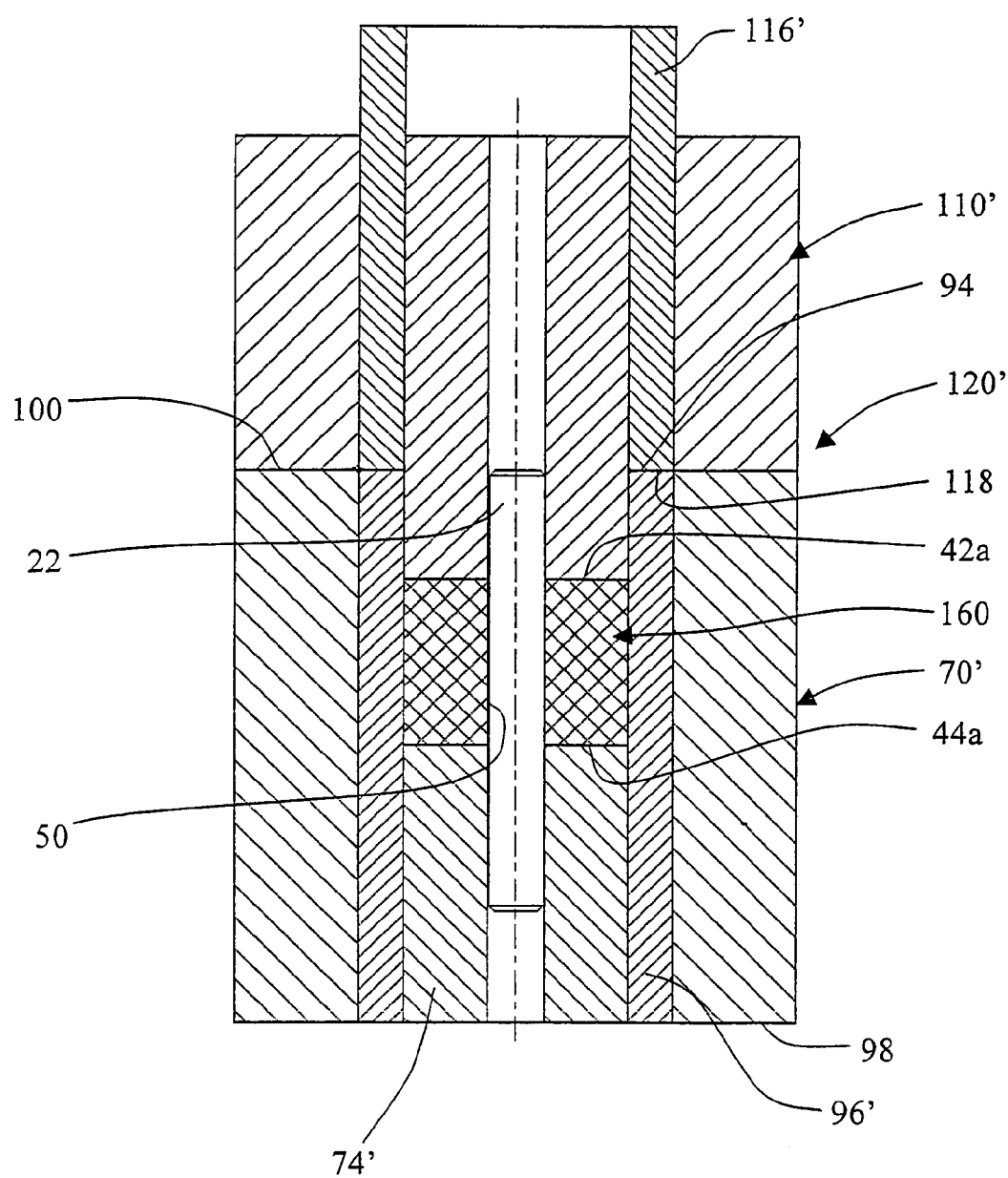
FIG. 13 shows a sectional representation similar to FIG. 12 with the green back yoke body produced by the mold.

The inner part 74' of the lower part 70' and the inner part 114' of the upper part 110' then form two rams, which are displaceable toward each other by the action of a force in the direction of the press-movement directions 152 and 154, in order to press the sintering powder in the receiving space 140, to be precise, as represented in FIG. 13, with the formation of a green back yoke body 160 of pressed sintering powder, the end sides 44a and 42a of which are spaced apart from each other by an amount equal to the later sintered back yoke body 26'''. At the same time, molding of the green back yoke body 160 onto the circumferential surface 50 of the shaft 22 takes place, so that as a result fixing of the green back yoke body 160 on the shaft 22 already takes place at the same time.

For the production of the rotor 20 according to the invention, there is now the possibility of first sintering the green back yoke body 160 and then inserting it into the mold 120 as a sintered back yoke body 26'''.

Figure 14:
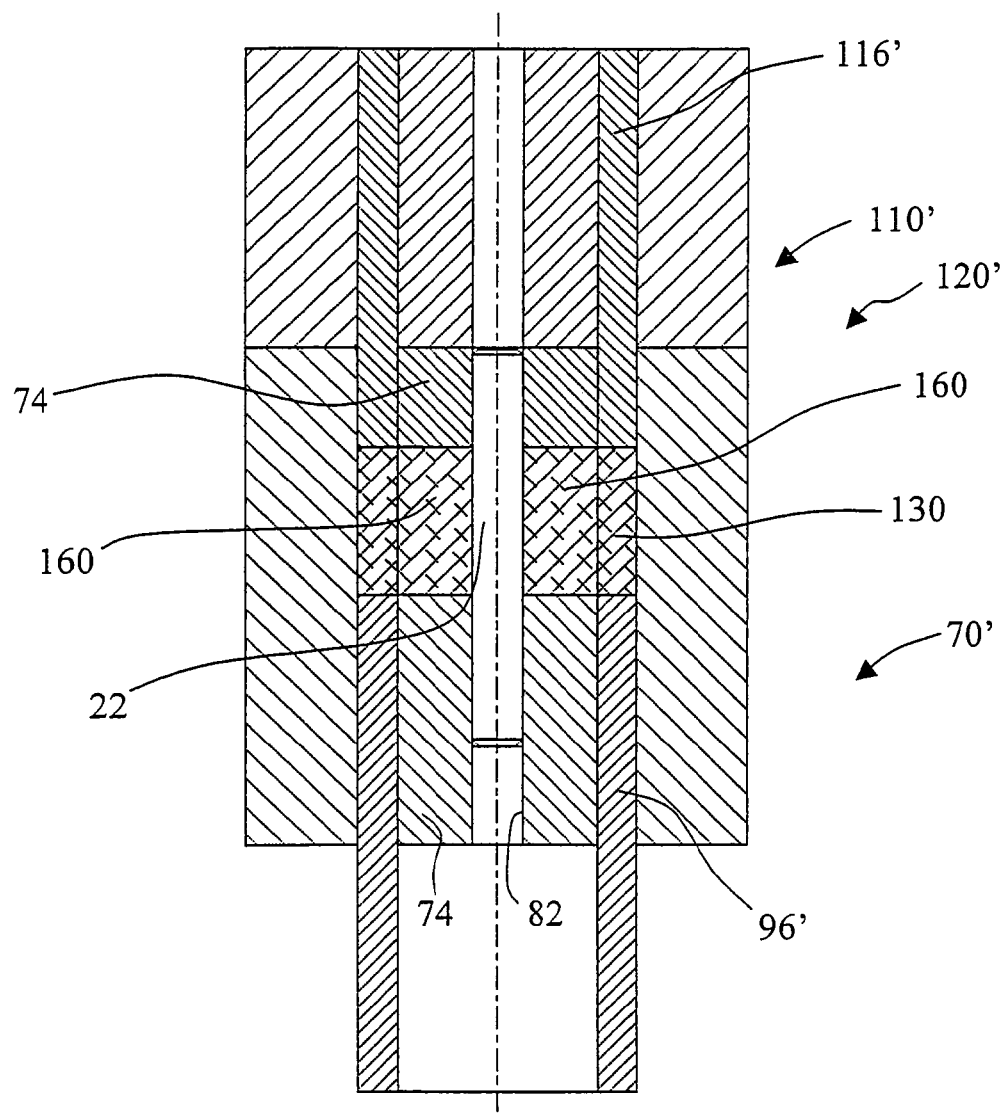
FIG. 14 shows a sectional representation of the mold similar to FIG. 13 with the green magnetic body molded onto the green back yoke body.

There is, however, also the possibility of removing the upper part 110' in the mold 120' and pulling back the annular ram 96' to the extent that its annular end face 94 is at a spacing from the end side 100 that leads to the forming of the receiving space 90 for sintering powder, and also inserting the inner part 74', so that in the same way as represented in connection with FIG. 7 the receiving space 90 can be filled with ferromagnetic sintering powder via the opening 102 and subsequently, by advancing the annular rams 116' and 96', the sintering powder in the receiving space 90 can be pressed to form the green magnetic body 130, and consequently the green magnetic body 130 can be directly molded onto the green back yoke body 160, so that subsequently joint sintering of the green magnetic body 130 together with the green back yoke body 160 can take place in order to obtain the sintered back yoke body 26''' and the sintered magnetic body 30 (FIG. 14).

Figure 15:
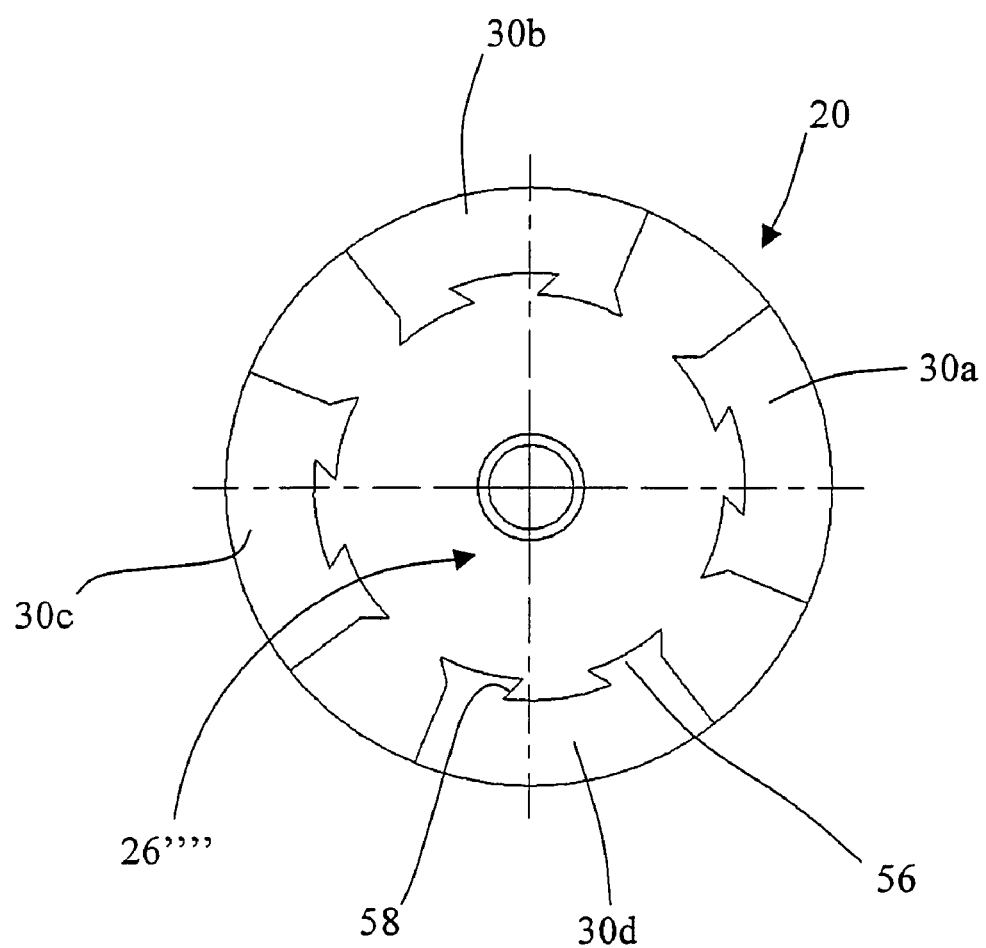
FIG. 15 shows a plan view similar to FIG. 3 of a rotor for a fifth exemplary embodiment of an electric motor according to the invention and FIG. 16 shows a schematic representation of a sixth exemplary embodiment of an electric motor according to the invention, designed as an external rotor.

In the case of a fifth exemplary embodiment of an electric motor 10' according to the invention, in FIG. 15, the rotor 20 is formed in such a way that the back yoke body 26'''' of the same has a total of four pockets, in which individual sintered magnetic bodies 30a, 30b, 30c and 30d are seated by molding onto the back yoke body 26'''' and are additionally fixed on the back yoke body 26'''' by the already described positively connecting elements 56 with undercuts 58.

Figure 16:
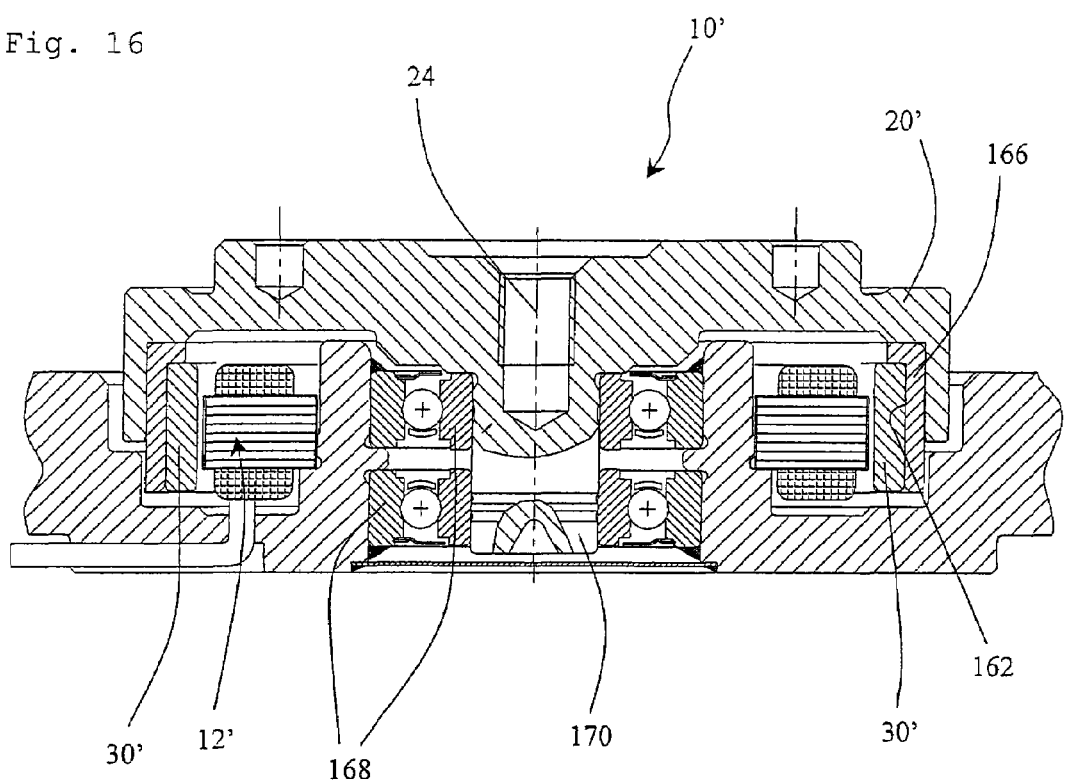

However, the solution according to the invention relates not only to electric motors 10 in which the rotor 20 is a so-called internal rotor but also, as represented in FIG. 16 on the basis of a sixth exemplary embodiment of an electric motor 10', to electric motors 10' in which the rotor 20' is a so-called external rotor and reaches around the stator 12', the sintered magnetic body 30' being molded onto an inner surface 162 of a back yoke body 166. The rotor 30' is mounted on the stator 12' by a molded-on shaft 170 by means of bearings 168. Consequently, the back yoke body 166 reaching around the stator 12' rotates about the axis 24 and serves for its part for receiving objects to be rotated, as known for example in connection with spindle motors.

LISTS OF DESIGNATIONS 10 electric motor
12 stator
14 pole element
20 rotor
22 carrier body, shaft
24 axis
26 back yoke body, molded back yoke body, sintered back yoke body
28 aperture
30 molded magnetic body, sintered magnetic body
32 peripheral side
34 back yoke side
36 air gap
38 air-gap side
40 direction
42 end face
44 end face
46 plane
48 cylindrical inner surface
50 circumferential surface
52 outer surface
54 inner surface
56 positively connecting elements
58 undercuts
60 projections
62 edge region
64 stack
66 metal laminations
70 lower part
22 outer part
74 inner part
76 inner part
82 central apertures
84 central apertures
86 outer side
88 outer side
90 receiving space
92 inner wall 94 annular end face
96 annular ram
98 end side
100 end side
102 opening
110 upper part
112 outer part
114 inner part
116 annular ram
118 annular end face
120 mold
122 press-movement direction
124 press-movement direction
130 green magnetic body
132 surface on air-gap side
140 receiving space
142 end side
144 inner wall
146 opening
148 end side
152 press-movement direction
154 press-movement direction
160 green back yoke body
162 inner side
166 back yoke body
168 bearing
170 shaft

The invention claimed is:

1. Brushless electric motor comprising:
a stator having pole elements, and
a rotor mounted rotatably in relation to the stator and comprising magnet poles of magnetic powder material sintered to form a continuous annular sintered magnetic body and a back yoke body carrying the annular sintered magnetic body,
said sintered magnetic body being molded onto the back yoke body, with a back yoke side of said sintered magnetic body abutting against the back yoke body, a region of the back yoke body carrying the annular sintered magnetic body having thermal expansion properties that are of the same order of magnitude as the thermal expansion properties of the annular sintered magnetic body.

2. Electric motor according to claim 1, wherein the back yoke body has positively connecting elements, onto which the sintered magnetic body is molded adaptively in terms of positive engagement.

3. Electric motor according to claim 2, wherein the positively connecting elements are effective in the radial direction.

4. Electric motor according to claim 1, wherein the sintered magnetic body butts against the back yoke body in an azimuthally closed manner.

5. Electric motor according to claim 1, wherein the back yoke body with a region carrying the sintered magnetic body is a molding part of a mold that is lost during the molding of the sintered magnetic body.

6. Electric motor according to claim 1, wherein the back yoke body is produced from solid steel.

7. Electric motor according to claim 6, wherein the back yoke body is a one-piece steel body.

8. Electric motor according to claim 1, wherein the back yoke body is formed as a stack of metal laminations.

9. Electric motor according to claim 1, wherein the back yoke body is formed from bonded powder material as a molded back yoke body.

10. Electric motor according to claim 9, wherein the molded back yoke body is molded onto a carrier body of the rotor.

11. Electric motor according to claim 10, wherein the carrier body of the rotor is a one-piece steel body.

12. Electric motor according to claim 9, wherein the molded back yoke body is a sintered back yoke body.

* * * * *